US008152530B2

(12) United States Patent
Price et al.

(10) Patent No.: US 8,152,530 B2
(45) Date of Patent: *Apr. 10, 2012

(54) RATING METHOD AND SYSTEM FOR EARLY CHILDHOOD EDUCATIONAL PROGRAMS

(75) Inventors: Douglas Price, Denver, CO (US); Anna Jo Haynes, Denver, CO (US); Meera Mani, San Jose, CA (US); Gerrit Westervelt, Denver, CO (US)

(73) Assignee: Qualistar Early Learning, Denver, CO (US)

( * ) Notice: Subject to any disclaimer, the term of this patent is extended or adjusted under 35 U.S.C. 154(b) by 51 days.

This patent is subject to a terminal disclaimer.

(21) Appl. No.: 12/716,074

(22) Filed: Mar. 2, 2010

(65) Prior Publication Data

US 2010/0167245 A1   Jul. 1, 2010

Related U.S. Application Data

(63) Continuation of application No. 12/197,871, filed on Aug. 25, 2008, now abandoned, which is a continuation of application No. 10/980,504, filed on Nov. 2, 2004, now abandoned, which is a continuation of application No. 10/057,273, filed on Jan. 24, 2002, now Pat. No. 6,916,180.

(60) Provisional application No. 60/264,149, filed on Jan. 24, 2001.

(51) Int. Cl.
    G09B 19/00   (2006.01)

(52) U.S. Cl. ......... 434/219; 434/118; 434/236; 434/350

(58) Field of Classification Search ............ 434/118, 434/219, 236
See application file for complete search history.

(56) References Cited

U.S. PATENT DOCUMENTS

| 5,365,425 A | 11/1994 | Torma et al. |
| 6,007,340 A | 12/1999 | Morrel-Samuels |
| 6,556,974 B1 | 4/2003 | D'Alessandro et al. |
| 6,916,180 B1 | 7/2005 | Price et al. |
| 2003/0154097 A1 | 8/2003 | Hartley et al. |
| 2005/0095566 A1 | 5/2005 | Price et al. |
| 2009/0061403 A1 | 3/2009 | Price et al. |

FOREIGN PATENT DOCUMENTS

WO   WO 89/12865   12/1989

OTHER PUBLICATIONS

Beansprout Networks: Busy families, Healthy children, © 2001, (webshot).
CareGuide, (webshot), accessed Mar. 16, 2009.
Family.com, (webshot), accessed Mar. 16, 2009.

(Continued)

Primary Examiner — Kang Hu
(74) Attorney, Agent, or Firm — Sheridan Ross P.C.

(57) ABSTRACT

The invention describes a method for evaluating educational programs which, firstly, develops criteria which will address the strengths and weaknesses of the educational program. The second step of the method is to observe the criteria, chosen in step one, in the educational program. The third step is to assign a numerical value to each of the criteria observed in step two. The next step is to assign an overall rating to the educational program based on the numerically valued criteria. The personnel involved in the educational program can then decide what steps in addition to the assessment can be done to improve or maintain the educational program.

35 Claims, 4 Drawing Sheets

OTHER PUBLICATIONS iVillage.com, Parent Soup, iVillage Inc., © 1995-2001, (webshot).
iVillage.com, The Women's Network, iVillage Inc., © 2000, (webshot).
KinderView, Cyber-Signs, Inc., © 1997-2000 (webshot).
National Child Care Information Center, Apr. 17, 2001, (webshot).
Oxygen, Oxygen Media, © 1998-2000 (webshot).
ParenthoodWeb.com, United Advertising Publications, Inc., © 2001 (webshot).
women.com, Jun. 14, Women.com Networks, Inc. © 1995-2001, (webshots).
women.com, Jun. 4, Women.com Networks, Inc. ©1995-2001, (webshots).
About Us: How It Works Kinderview, Inc., © 2000-2001, 1 page.
Arkansas.gov: Google Search Results, Arkansas.gov, Feb. 18, 2004, 2 pages, http://www.accessarkansas.org/search/arportal_search.php.
Aronovitz, "Family Child Care, Innovative Programs Promote Quality" Dec. 9, 1994, GAO.
Astin, et al: "American Association for High Education, Assessment Forum—9 Principles of Good Practice for Assessing Student Learning" dated Jan. 10, 2002, 2 pages, available at http://www.aahe.org/assessment/principl.htm.
Barbour et al., "Governor Patton Announces First Child Care Centers in Kentucky to Receive Star Ratings" Aug. 2, 2001.
Barnett, "*Long-Term Effects of Early Childhood Programs on Cognitive and School Outcomes*" The Future of Children, vol. 5, No. 3, Winter, 1995.
Benefits for Centers, Kinderview, Inc., 2000-2001, 1 page.
Benefits for Parents, Kinderview, Inc., 2000-2001, 1 page.
Casey, "Child Care Rating Project Halted", Reviewjournal, Apr. 16, 2003, 5 pages.
Child Care Administration Maryland Department of Human Resources Annual Report 2002, Maryland Human Services Agency, 2002, 16 pages.
"Child Care and Development Fund Plan" Oklahoma State Plan for CCDF Services, Oct. 1, 2003, 54 pages.
"Choosing a Preschool: Development" Beansprout Networks, Inc., 2000-2002, 2 pages.
Collins, "Quality Rating Strategies: State Trends in 2001" NCCIC, Jan. 1, 2001, 1 page.
"*Creating Better Family Child Care Jobs: Model Work Standards for Teaching Staff in Center-Based Child Care*" Center for the Child Care Workforce, 1998, pp. 1-36.
"*Creating Better Family Child Care Jobs: Model Work Standards*" Center for the Child Care Workforce, 1999, pp. 1-43.
Cross et al., "Children at Risk: Why the Quality of Child Care Matters" Healthy Child Care Indian, Jun. 2002, pp. 1-4.
"Daycare Viewing and Streaming Systems—Kinderview.com" Kinderview, Inc., 2000-2001, 1 p.
Delfico, "Child Care Quality, State's difficulties enforcing standards confront welfare reform plans" U.S. General Accounting Office, Feb. 11, 1994.
Dietz, Michael J., Editor, "*School, Family and Community*" Aspen Publishers, Inc., 1997, 190 pages.
"Division of Child Care—Home Page" Oklahoma Department of Human Services, (date unknown), 1 page.
"Early Childhood Educational Intervention for Poor Children" *The Carolina Abecedarin Project Executive Summary*, Oct. 1999.
Early Childhood Quality Improvement System, "*Process for Achieving Reliability on the Environment Rating Scales with the Colorado Core*" The Center for Human Investment Policy, University of Colorado at Denver, Aug. 2001, pp. 1-44.
"Fact Sheet: Environment Rating Scales" For TN Dept. of Hum. Serv. By UT Social Work Office of Research & Pubic Service, Sep. 14, 2001, 2 pages.
Harms and Clifford, "*Family Day Care Rating Scale*" Teachers College Press, 1989, pp. 1-49.
Harms, Cryer, and Clifford, "*Early Childhood Environment Rating Scale*" Teachers College Press, © 1998, pp. 1-64.
Harms, Cryer, and Clifford, "*Infant/Toddler Environment Rating Scale*" Teachers College Press, 1990, pp. 1-47.
Helburn, Suzanne W., *Cost, Quality and Child Outcomes in Child Care Cneters Technical Report*, Jun. 1995, pp. 1-381.
High/Scope Educational Research Foundation, *High Quality Preschool Program Found to Improve Adult Status*, 1993, 10 pages.
Hodges, "Most Rowan Day-Care Centers Getting Lowest Rating", Salisbury Post, Feb. 25, 2001, 3 pages.
Howes, Phillips, & Whitebrook, *Thresholds of Quality: Implications for the Social Development of Children in Center-based Child Care, Child Development*, vol. 63, pp. 449-460, 1992.
Howes, "Quality in Child Care: What does Research Tell Us?" National Association for the Eduation of Young Children, vol. 1, 1987.
Kontos, Howes, Shinn & Galinsky, *Quality in Family Child Care and Relative Care*, Teachers College Press, 1994, pp. 62-84.
Literature Summary High Quality Early Childhood Education Improves the Lives of Children and Families, Dec. 24, 1997, 15 pages.
Massachusetts Cost and Quality Study, *The Cost and Quality of Full Day, Year-round Early Care and Education in Massachusetts: Preschool Classrooms*, Center for Research on Women and Massachusetts Department of Education, 2001, pp. 1-62.
Newsome, et al. "Guidelines for Establishing a Family Day Care System, 1973", pp. 1-62.
NICHD Early Child Care Research Network, "Child Outcomes When Child Care Center Classes Meet Recommended Standards for Quality" American Journal of Public Health, vol. 89, No. 7, Jul. 1999.
NICHD Early Child Care Research Network, "Structure, Process, Outcome: Direct and Indirect Effects of Caregiving Quality on Young Children's Development" Psychological Science, vol. 13, Issue 3, pp. 199-206, May 2002.
Norris et al., "Reaching for the Stars: Center Validation Study Final Report" ECCO, Nov. 2003, pp. i-56.
Norris et al., "Reaching for the Stars: Center Validation Study Executive Summary" *ECCO*, Nov. 2003, 4 pages.
Outlaw: "Child care Centers Garner State's Highest Quality Rating" Vanderbilt University Register, 2002, 2 pages.
Phillipsen, Burchinal, Howes & Cryer, "The Prediction of Process Quality from Structural Features of Child Care" Early Childhood Research Quarterly, vol. 12, pp. 281-303 (1997).
Popham., "Why Standardized Tests Don't Measure Education" Educational Leadership, vol. 56, No. 6, 3/99, 9 pages, available at http://www.ascd.org/readingroom/edlead/9903/extpopham.html.
"Proposal for an Iowa Child Care Quality Rating System" Nov. 2003, pp. 1-16.
"Purchase of Child Care Program Changes Impact Payment" Summer 2001 Edition of CCA Newsletter Partners, 1 page.
"Reaching for the Stars Frequently Asked Questions" ECCO, (date unknown), 6 pages.
Schweinhart & Weikart, High/Scope Perry Preschool Program Outcomes, High/Scope Educational Research Foundation, 1993.
Schweinhart & Weikart, Summary of Significant Benefits: The High/Scope Perry Preschool Study through Age 27, High/Scope Educational Research Foundation, 1993.
Shonkoff & Phillips, "From Neurons to Neighborhoods, The Science of Early Childhood Development" National Academy Press, pp. 311-321, 2000.
"Stars—The Childcare Quality Rating System" KY Department of Education, Feb. 4, 2004, 3 pp.
"Starting a Child Care Center in Oklahoma" Oklahoma Department of Human Services, (date unknown), pp. 1-58.
"Tennessee's Child Care Evaluation & Report Program Program" Tennessee Department of Human Services Child Care Services, (date unknown), 3 pages.
Howes et al., "The Florida Child Care Quality Improvement Study" 1996 Report, Family and Work Institute, pp. 1-85.
"The TN Child Care Evaluation & Report Card Programs" University of Tennessee College of Social Work Office of Research and Public Services, © 2002, 2 pages, http://tnstarquality.org/html/report_cards.htm.
"Tiered Strategies: Quality Rating, Reimbursement, Licensing" NCCIC, Nov. 2002, pp. 1-9.
"TN Licensing Criteria" (date unknown), 1 p., http://tnstarquality.org/html/popups/criteria.htm.

Tucker, "Quality Rating Scale" The Child Care Professional, Feb. 2001, vol. 9, Issue 6, pp. 1-4.
VonBargen, "FY-2002 Annual Report for the Division of Child Care" Division of Child Care, 2002, pp. 1-16.
"What to Look for in a Provider" Beansprout Networks, Inc., 2000-2002, 3 pp.
Official Action for U.S. Appl. No. 10/057,273, mailed Apr. 4, 2003.
Notice of Allowance for U.S. Appl. No. 10/057,273, mailed Jun. 15, 2004.
Official Action for U.S. Appl. No. 10/057,273, mailed May 31, 2005.
Official Action for U.S. Appl. No. 10/980,504, mailed Mar. 21, 2008
Official Action for U.S. Appl. No. 10/980,504, mailed Oct. 31, 2008.
Offcial Action for U.S. Appl. No. 12/197,871, mailed Dec. 11, 2009.
Offcial Action for U.S. Appl. No. 10/057,273, mailed Nov. 28, 2003.
Educare Narrative, Fall 2000, 10 Minute Overview, 4 pages, pp. 41-44 of Apendix to the Specification filed Mar. 2, 2010.
Educare Site Self Assessment p. 186 of Apendix to the Specification filed Mar. 2, 2010.
Educare 4 Star p. 167 of Apendix to the Specification filed Mar. 2, 2010.
Toolbox.com p. 45 of Apendix to the Specification filed Mar. 2, 2010.
ParentToolbox.org p. 45 of Apendix to the Specification filed Mar. 2, 2010.
ChildcareToolbox.com p. 45 of Apendix to the Specification filed Mar. 2, 2010.
Kidtoolbox.com p. 46 Apendix to the Specification filed Mar. 2, 2010.
Careguide.com pp. 66-71 of Apendix to the Specification filed Mar. 2, 2010.
National Association of Family Child Care pp. 8-10 of Apendix to the Specification filed Mar. 2, 2010.
Educare Colorado—Child Care and Educational Quality Improvement Model, Jan. 23, 2001, Denver, CO, pp. 1-12.
Educare Colorado—The Rand-Omni Evaluation of Educare Colorado. Jan. 19, 2001. 2 pages.
Nadel, "Child Care: Use of Standards to Ensure High Quality Care" U.S. General Accounting Office Health, Education and Human Services Division, Jul. 31, 1998, 16 pages.

RATING METHOD AND SYSTEM FOR EARLY CHILDHOOD EDUCATIONAL PROGRAMS

CROSS REFERENCE TO RELATED APPLICATIONS

This application is a continuation of U.S. Continuation patent application Ser. No. 12/197,871 filed Aug. 25, 2008, which is a continuation of U.S. Continuation patent application Ser. No. 10/980,504 filed Nov. 2, 2004, which is a continuation of U.S. patent application Ser. No. 10/057,273 filed Jan. 24, 2002, now U.S. Pat. No. 6,916,180 issued Jul. 12, 2005, which claims the benefit of U.S. Provisional Patent Application Ser. No. 60/264,149 filed Jan. 24, 2001. The entire disclosures of the prior applications hereinabove are incorporated herein fully by reference.

FIELD OF THE INVENTION

The invention concerns generally a method and system for evaluating educational programs, specifically providing a rating system based on pre-determined evaluation factors.

BACKGROUND OF THE INVENTION

There is a compelling public stake in education. As anyone who listens to the news understands, however, our educational institutions are not meeting the public's expectations regarding education. There is a great need to improve educational quality in both public and private educational institutions. The first problem in improving educational quality is assessing the quality of the educational program or institution. Educators have to show their effectiveness and the chief indicator by which most communities judge a school staff's success is student performance on standardized achievement tests. As is repeatedly discussed and debated in the media, however, standardized tests may not accurately show the quality of education. They merely make norm-referenced interpretations of students' knowledge and/or skills in relationship to those of students nationally.

In addition, standardized tests do not take into account the multi-dimensional aspect of a person's education. For instance, the standardized tests do not account for a student's innate intellectual ability. Standardized tests also fail to account for a student's learning outside of the school setting. There is no national standard for these standardized tests. Different states choose somewhat different educational objectives or different content standards. Further, some states do not even use the same standardized tests for all of the counties within that state. There is a national call for an assessment system that can be applied to each and every school in each school district in each county in each state of the United States of America.

The problem with assessing the quality of education becomes worse when one's attention is directed to early childhood education and care. No standardized tests are administered to our kindergarten students, pre-school students, and child care attendees. Thus, assessing the quality of such programs is difficult and very subjective, with many parents relying on the recommendations of other parents (who may place different values on education) or their own gut feelings about a facility.

Millions of children are receiving early care and education that is inadequate, with many receiving care that is actually or potentially harmful to their development and learning capacities. More children are experiencing child care and pre-school than ever before in America's history. For example, in 1950, 1 mother in 10 worked outside the home. Today, more than 6 out of 10 mothers of children under three are working outside the home, and that number is projected to increase to more than 7 out of 10 by 2005. Research shows that 87% of out-of-home child care settings are considered poor or mediocre.

From birth to age 5, children are in a period of explosive brain development and growth. This age period is critical to a child's social and cognitive development. 85% of a person's intellect, personality and social skills are developed by age five. Yet, 95% of public investment in education occurs after children reach the age of five—when the most critical learning years have passed. Indeed, our society does not even begin its only measure, standardized tests, of education until the child is in the $1^{st}$ grade—age 6 or 7. This may be because of the difficulties and expense of testing children under the age of 6 or 7. Children below the age of 6 or 7 are pre-verbal and pre-literate so testing methodologies are difficult and measuring actual learning in children below 6 or 7 can be next to impossible.

The American Association for Higher Education has published an article entitled "Nine Principles of Good Practice for Assessing Student Learning", incorporated herein by reference. One familiar with education and educational programs will recognize that these principles can be applied to any level of education.

The first principle is that the assessment of student learning begins with educational values. The Association states that assessment is not an end in itself but a vehicle for educational improvement. Educational values should drive not only what is assessed but also how it is assessed.

The second principle in the assessment of learning is to recognize that assessment is most effective when it reflects an understanding of learning as multi-dimensional, integrated, and revealed in performance over time. As the Association states, learning is a complex process. It entails not only what students know, but what they can do with what they know.

The third principle is that assessment works best when the programs it seeks to improve have clear, explicitly stated purposes. The fourth principle is that assessment requires attention to outcomes but also and equally to the experiences that lead to those outcomes. The fifth principle is that assessment works best when it is ongoing, not episodic.

The sixth principle is that assessment fosters wider improvement when representatives from across the educational community are involved. This means getting the students, the teachers, the parents, the administration and the community working together as one cohesive group. The seventh principle is that assessment makes a difference when it begins with issues of use and illuminates questions that people really care about. The eighth principle is that assessment is most likely to lead to improvement when it is part of a larger set of conditions that promote change. The ninth and last principle is a recognition that through assessment, educators meet responsibilities to students and to the public.

No comprehensive assessment tool of learning that embodies these nine principles presently exists. There is also no comprehensive assessment tool that measures the learning program which will embody these nine principles. Thus, there is a long-felt and unsolved need for an assessment tool for educational programs, adaptable to all levels of education, preferably embodying or recognizing the nine principles of assessing learning, as applied to a educational program.

SUMMARY OF THE INVENTION

The present invention provides an assessment method that will allow an educational program to be assessed with respect to all nine principles discussed above, not only for higher education but for all levels of educational care, and that is understandable to all of the persons involved in the process. The only way to approach measuring learning in young children is to measure the strengths and weaknesses of the learning program in which the child is enrolled. Our society's approach to education is backward. The focus of improving education should begin with early child care facilities and continue through advanced degree institutions. In addition, it is important to note that focusing on individual students to measure the quality of an educational program is not a logical method of measuring the quality of the program. Most businesses do not measure their quality according to the quality of each and every individual employee. Instead, the business focuses on procedures, training, programs and other measures of that the business can control to improve and measure the quality of the business. The same approach should be taken with respect to educational programs, instead of the current focus of placing the responsibility of the quality of the program on those who have the least control over improving or altering the program—the students.

In one embodiment of the invention, the invention describes a method for evaluating educational programs which, firstly, develops criteria which will address the strengths and weaknesses of the educational program. The criteria can be tailored to fit each different level or type of educational program. The second step of the method is to observe the criteria, chosen in step one, in the educational program. This observation step can include but is not limited to collecting documents, surveys, classroom observations, interviews, and other types of information gathering techniques. The third step is to assign a numerical value to each of the criteria observed in step two. In one embodiment, the numerical value assigned is any number between 1 and 4. One will easily recognize that the numerical value assigned can be of any range of numbers or letters. The last step, in this embodiment, is to assign an overall rating to the educational program based on an alphanumeric (hereinafter generally referred to as "numeric") valued criteria.

In another embodiment of the invention, the invention describes a method which, firstly, develops criteria which address the strengths and weaknesses of the particular level of the educational program. The second step of the invention is to observe factors in the educational program, with each of the factors relating to one or more of the criteria. Again, the observation step includes information gathering techniques, including but not limited to collecting documents, conducting interviews, surveys, and classroom observation. Each factor is then assigned a numerical value. The numerical values of the factors are sorted to correspond with the one or more criteria to which the factor relates and averaged in order to assign a numerical value for each criterion. The last step of this embodiment of the invention is to assign an overall rating to the educational program based on the numerical values of the criteria.

In a further embodiment of the invention, the invention describes a method of evaluating an educational program which, firstly, develops criteria which address the strengths and weaknesses of the educational program. The second step is to observe factors in the educational program, with each of the factors relating to one or more of the criteria. Again, the observation step includes information gathering techniques, including but not limited to collecting documents, surveys, conducting interviews, and classroom observation. Each factor is then assigned a numerical value. This numerical value is weighted and multiplied by the numerical value to give a weighted numerical value. The weighted numerical values of the factors are sorted to correspond with the one or more criteria to which the factor relates. The weighted numerical values are then averaged within each criterion to give a quantitative value to each criterion. An overall rating is then assigned to the educational program based on the quantitative value of the criteria.

In yet another embodiment of the invention, the invention describes a method of evaluating an educational program which, firstly, develops criteria which address the strengths and weaknesses of the educational program. The criteria are typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. The third step is to observe the criteria in the educational program. As discussed above, the observation step can include any form of information gathering technique. A numerical value is then assigned to the criteria and an overall rating is assigned based on the numerically valued criteria. The last step in this embodiment is to debrief the personnel on the overall rating.

In another aspect of the present invention, one embodiment is directed to a method of improving an educational program. The first step in this embodiment is to evaluate the educational program by assigning an overall rating to the educational program. The rating is based on observations of criteria which address the strengths and weaknesses of the educational program. The second step is to identify the weak areas of the educational program and develop an improvement process to address the weak areas. The next step is to identify the strong areas of the educational program and develop a maintenance program to maintain the strength of the educational program. The last step is to reevaluate the educational program, at some later point in time, to determine the extent of improvement and maintenance.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

In another embodiment of the invention, the invention comprises a system for evaluating an educational program which utilizes means for developing criteria which address strengths and weaknesses of the educational program, means for observing the criteria in the educational program, means for assigning a numerical value to the criteria; and, means for assigning an overall rating to the educational program based on the numerically valued criteria. The means for accomplishing each of these functions can be embodied in a series of papers filled out by a person, a paper database filled out by a person, an electronic database filled out by a person, or other tools for development, observation and assigning numbers.

These and other objects, features, and advantages of the invention will become apparent from the following best mode description, the drawings and the claims.

BRIEF DESCRIPTION OF THE DRAWINGS

The figures which follow depict at least one embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing figures refer to identical elements or components.

DETAILED DESCRIPTION

At the outset, it should be understood that this invention comprises a method of evaluating an educational program that can be applied at any level of education. The description which follows described a preferred embodiment of the invention, and various alternative embodiments. It should be readily apparent to those skilled in the art, however, that various other alternative embodiments may be accomplished without departing from the spirit or scope of the invention.

For the purposes of describing the aspects of the invention, the discussion that follows will discuss the application of the invention to early childhood care and education programs. It should be understood that the invention can be easily adapted to be applied to any level of educational program.

Figure 1:
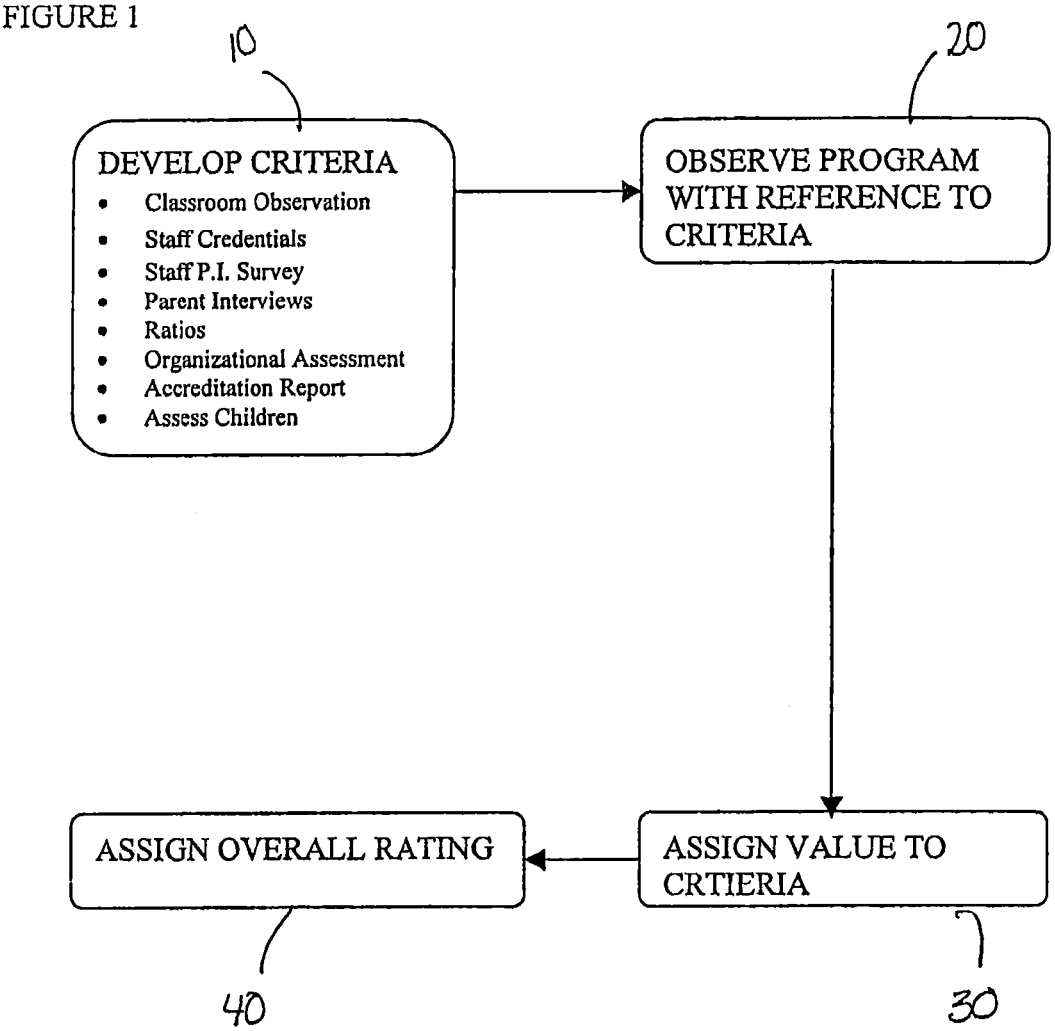
FIG. 1 depicts a flowchart of one embodiment of the method of the invention.

FIG. 1 depicts a flowchart of a method for evaluating educational programs which, firstly, develops criteria which will address the strengths and weaknesses of the educational program. The criteria can be tailored to fit each different level of educational program. The general criteria that would apply, particularly to an early educational program, include but are not limited to classroom environment, accreditation, parent involvement, staff credentials, presence of a curriculum, and staff to child ratios.

Classroom environment can be measured in any number of ways. There are known methods of evaluating classroom environment, including but not limited to the Early Childhood Environment Rating Scale (ECERS-R), the Infant/Toddler Environment Rating Scale (ITERS) or the Family Day Care Rating Scale (FDCRS), all published by Teachers College Press and incorporated in their entireties herein. The ECERS-R and the ITERS recommend observing factors about the classroom such as space and furnishings, personal care routines, language/reasoning activities or materials, physical activities, interaction between staff and children, program structure and interaction between parents and staff. In observing space and furnishings, one focuses not only on the physical furnishings available to the children but to the adequacy and cleanliness of such physical furnishings. For example, one would note the adequacy of lighting and natural lighting, ventilation, temperature control, sound absorbing material, peeling paint, and the sufficiency of the space. The space and furnishings factor also takes into account the furniture and condition of the furniture for routine care, play and learning, relaxation and comfort, privacy, and gross motor equipment and space.

The personal care routine factor looks at greeting and departure rituals, meal and snack schedule and procedures, nap and rest schedule and procedures, toileting and diapering schedule and procedures, health practices such as hand washing, appropriate clothing, and tooth brushing, and safety practices such as clean up of toys, emergency numbers, and presence of safety rules which are explained to the children.

The language/reasoning factor concerns the amount, presence and appropriateness of books and pictures, encouragement of children to communicate, use of logic play such as sequence cards, sorting games, number and math games, and informal use of language on individual bases.

The activities factor described above as one of the factors to observe concerns the development and use of children's fine motor skills, the presence and use of activities related to drama, art, music or movement, the play and use of blocks and block sets, the play and use of sand/water, the presence of nature/science/math activities, the use of television, computers and videos, and the promotion of acceptance of diversity. The interaction factor observes the adequacy of supervision of the children's gross motor activities, supervision in general, discipline of the children, staff-child interactions such as appropriate physical contact, respect for children on the part of the staff, staff's enjoyment of the children, and the interactions between and among the children including resolution of conflicts between children.

The program structure factor is concerned with the scheduling of activities, the presence and amount of free time and group time, and the adequacy of provisions for children with disabilities. The parents and staff factor observes the accommodations made for parents such as allowing parents to observe the child in group and prior to enrollment, brochures or other types of program descriptions given to parents, annual parent evaluations. This factor also observes the provision made for the staff such as a separate washroom, area to store personal belongings away from the children, and amount and flexibility of breaks. The parents and staff factor also observes the adequacy of the provisions for the professional needs of the staff and the staff interaction and cooperation, the supervision and evaluation of staff, and opportunities for professional growth are offered to the staff. The Center for the Child Care Workforce issues publications on creating Better Child Care Jobs, Creating Better Family Child Care Jobs and Model Work Standards for child care workers. These brochures are incorporated in their entireties by reference herein. The Model Work Standards for Child Care Workers include standards on wages, benefits, job descriptions and evaluations, hiring and promotions, termination, suspension, severance and grievance procedures, classroom assignments, hours of work and planning time, communication, team building and staff meetings, decision making and problem solving, professional development, professional support; diversity, health and safety, and physical space requirements.

The FDCRS recommends observing factors such as space and furnishings, basic care, language and reasoning, learning activities, social development, and adult needs. The space and furnishings factor analyzes the presence of furnishings for routine care and learning, the presence of furnishings for relaxation and comfort, the presence and use of a child-related display, the indoor space arrangement, the provisions for active physical play, and the provision of space for the child to be alone. The basic care factor includes observing the arrival and departure of the children, the provision of meals and snacks, the provision of nap and rest time, provision for the diapering and toilet needs of the children, attention paid to personal grooming, and the health and safety of the home.

The language and reasoning factor observes the informal use of language in relating to the children, whether the care giver helps children understand language, whether the care giver helps children use language, and whether the care giver helps children reason through the use of sequence cards, etc.

The learning activities factor assesses whether the family home provides for hand to eye development, art, music and movement, sand and water play, blocks, and dramatic play activities for the children. The learning activities factor also assesses the use of television as an activity, schedule of activities, and supervision of play indoors and outdoors.

The social development factor observes the care giver's tone when interacting with the children, the care giver's discipline of the children, and the care giver's cultural awareness and diversity as assessed by the racial variety shown in books, pictures, and other play toys. The adult needs factor is analyzed by observing the care giver's relationship with the parents of the children, how the care giver balances personal and care giving responsibilities, and the care giver's opportunities for professional growth.

The Model Work Standards for Family Child Care Jobs includes standards on provider income, provider benefits, hours of work, provider-parent communication, professional development, work environment, community support in case emergencies arise, and standards for the provider becoming an employer. These Model Work Standards are also included as factors to be observed and accounted for in the classroom observation criteria, the staff credentials criteria, and the accreditation criteria of the educational program.

The present inventors contemplate using one of these known methods of classroom environment to accomplish the step of observing the classroom environment. However, such contemplation of use of known methods of classroom observation does not preclude the present inventors from developing their own methods of classroom environment observation or from using such developed methods as part of the present invention. The present inventors currently contemplate developing their own methodology for observing classroom environment, specifically to streamline the observation from the intricacies and overlapping areas of the known methodologies.

The second step of the method is to observe the criteria, chosen in step one, in the educational program. This observation step can include but is not limited to collecting documents, reviewing financial information about the educational program, classroom observations, interviews, and other types of information gathering techniques. It should be understood that, throughout each of the descriptions of the various embodiments of the invention described herein, that the data collection, observation and criteria can be accomplished either through traditional paper processing methods and/or also through electronic processing methods, either through the use of laptop computers with a database of the various criteria programmed therein or through the use of hand-held electronic devices and communication links to allow the hand-held devices to communicate with a parent computer. Should an electronic processing method be used in the collection and observation of the criteria, it follows that the subsequent steps can also be conducted through electronic processing means.

The third step is to assign a numerical value to each of the criteria observed in step two. This, again, can be performed either through paper processing or electronic processing methods. In one embodiment, the numerical value assigned is any number of stars between 1 and 4. One will easily recognize that the numerical value assigned can be of any range of numbers or rating symbols such as stars, circles, dollar signs or the like. The classroom environment criteria, according to one embodiment of the present invention, requires minimum scores, as rated according to FDCRS, ECERS-R and ITERS, as follows:

3.00 in order to achieve one star;
3.51 in order to achieve two stars;
4.26 in order to achieve three stars; and,
5.00 in order to achieve four stars.

The accreditation criteria reflects whether the educational program is accredited by appropriate state, local or federal institutions, or as discussed in more detail in the appendix attached hereto, by a nationally recognized professional association such as the National Association for the Education of Young Children or the National Association of Family Child Care. Moreover, such professional associations are typically non-governmental organizations, and such professional associations require a child care provider to complete an extensive self-study of all aspects of early child care and education. Moreover, such associations perform on-site visits to assure accreditation criteria are satisfied. Note that such non-governmental accrediting associations accredit a plurality of independently owned and operated child care facilities, as one skilled in the art will readily understand. In one embodiment of the invention, accreditation is required in order to achieve a four star rating. In another embodiment of the invention, two points are assigned to the accreditation criteria when accreditation is achieved and as maintained.

The parent involvement criteria focuses on an evaluation of fourteen factors reflecting basic communication and responsiveness to parent perspectives. In one embodiment, increasing expectations are set for these criteria as the level and types of parent involvement become more sophisticated. There are 6 types of parent involvement: parenting, communicating, participating or volunteering, learning at home, decision-making or leadership, and community involvement. A Parenting parent typically creates a home environment that supports the child's healthy growth and development. A Communicating parent typically shares information about the child's progress, significant events, interests, and the parent's child-rearing philosophy and educational goals. A Participating/Volunteering parent typically takes part in classroom and program activities as a member of program "community", e.g. volunteering in the classroom, helping with fund-raising, attending family events, donating materials or expertise. A Learning at Home parent typically provides activities to stimulate children's learning and development, e.g. reading to children, making drawing materials available, playing matching games, having conversations about shared experiences. A Decision-Making/Leadership parent advocates and provides guidance on issues that affect the parent's child or children in the program, e.g. setting learning goals with staff, sitting on an advisory board, or speaking at public meetings. Finally, a Community Involvement parent takes part in groups and activities and uses community resources, takes an active role as a community member, e.g. being active in a faith community, being a scout leader, supporting cultural events. Thus, as the sophistication of the parents of children in the educational program increase, more involvement is expected from those parents.

The fourteen criteria and their effects on the star rating assigned to this criteria as part of one embodiment of the present invention is described in Table 1.

TABLE 1

Parent Involvement Criteria

| Factor | Star 1 | Star 2 | Star 3 | Star 4 |
|---|---|---|---|---|
| Program documents providing written information on program | REQ'D. | REQ'D. | REQ'D. | REQ'D, |

TABLE 1-continued

Parent Involvement Criteria

| Factor | Star 1 | Star 2 | Star 3 | Star 4 |
|---|---|---|---|---|
| philosophy, policies & procedures | | | | |
| Program documents orientation to the program for both parent and child prior to or immediately following enrollment | REQ'D. | REQ'D. | REQ'D. | REQ'D. |
| Program reports timely notification of major changes in program or policies (e.g. change in teach, change in fees, change in schedule) and no more than 25% of parents report lack of timely notification | REQ'D. | REQ'D. | REQ'D. | REQ'D. |
| 75% of parents report that program welcomes visits by parent at all times | REQ'D. | REQ'D. | REQ'D. | REQ'D. |
| 75% of parents report at least adequate information from program on child's day-to-day physical and emotional well-being | Min. score of 3 | Min. score of 3 | Min. score of 4 | Min. score of 4 |
| 75% of parents report at least adequate response by program to parent concerns & suggestions | Min. score of 3 | Min. score of 3 | Min. score of 4 | Min. score of 4 |
| 75% of parents report at least adequate information from program on child's daily activities, i.e., how each day is planned, what child enjoys, how he/she plays with other children, etc. | NA | Min. score of 3 | Min. score of 4 | Min. score of 4 |
| 75% of parents report being at least somewhat comfortable asking teacher for information on child development or parenting techniques | NA | Min. score of 3 | Min. score of 3 | Min. score of 4 |
| Program documents conducting planned individual parent conferences at least annually to discuss child's progress and plans to meet learning goals | NA | REQ'D. | REQ'D. | REQ'D. |
| 75% of parents report receiving at least adequate information from program on learning goals for children, teaching approaches, how behavior is managed in class, etc. | NA | NA | Min. score of 3 | Min. score of 4 |
| 50% of parents who have offered ideas/suggestions to the program report that suggestions are implemented | NA | NA | REQ'D. | REQ'D. |
| 75% of parents report receiving at least adequate information from the program about community services | NA | NA | Min. score of 3 | Min. score of 4 |
| Program documents regularly including parents in program evaluation | NA | NA | NA | REQ'D. |
| Program staff and parents report planned, successful activities in these types of parent involvement: parenting communication participating/volunteering learning at home leadership/decision-making community involvement | No add'l requirements | α | α α | α α α |

α - In addition to required activities, staff AND at least 40% of parents as an aggregate identify activities in at least two of the six types of parent involvement.
α α - In addition to required activities, staff AND at least 60% of parents as an aggregate identify activities in at least four of the six types of parent invention. Program has a written, cohesive plan for parent involvement.
α α α - In addition to required activities, staff AND at least 75% of parents as an aggregate identify activities in at least five of the six types of parent involvement. Parent involvement is an integral part of an annual program plan and evaluation.

The staff credentials criterion observes the professional credentials for each staff member with specific expectations for education, experience and position. Individual staff ratings are averaged by position and weighted and a number is assigned for this criteria. The staff to child ratios criterion focuses on the number of staff to children. In one embodiment of the present invention, for educational program centers, the expectations of the ratio increases from licensing up through standards set by national accrediting bodies. For full-day programs, target ratios should be maintained for 76 of 80 time stamps over 20 days of data collection. For part-day programs, target ratios should be met for 19 of 20 time stamps over 20 days. For one embodiment of the present invention, the target ratios are also geared to specific age groups as shown in Table 2.

TABLE 2

Target Ratios based on Age Groups

| AGE GROUP | Star 1 | Star 2 | Star 3 | Star 4 |
|---|---|---|---|---|
| 0-18 mos. | 1:5 | 1:4 (¾ time stamps) | 1:4 all day | 1:3 |
| 18-24 mos. | 1:5 | 1:4 (¾ time stamps) | 1:4 all day | 1:3 |
| 24-36 mos. | 1:7 | 1:6 (¾ time stamps) | 1:6 all day | 1:5 |
| 30-36 mos. | 1:8 | 1:7 (¾ time stamps) | 1:7 all day | 1:6 |
| 36-48 mos. | 1:10 | 1:9 (¾ time stamps) | 1:9 all day | 1:8 |
| 48-60 mos. | 1:12 | 1:10 (¾ time stamps) | 1:10 all day | 1:8 |

In other age groupings, one embodiment of the present invention recommends using the staff ratio for the youngest child if more than 20% of the group is composed of younger children. In one embodiment of the present invention, for family homes, the staff to child ratios described in the licensing requirements are required to earn any points. In this embodiment, 4 points are assigned to the family home if in compliance with licensing requirements.

The last step, in this embodiment, is to assign an overall rating to the educational program based on the numerically valued criteria. This overall rating can be accomplished using a number of numerical methods including but not limited to averaging, weighting and averaging, or addition of the scores of the various criteria developed in step one, observed in step two, and rated in step three. The overall rating can be calculated using conventional mathematical tools or can be calculated through electronic processing means. In one embodiment of the invention, the points assigned to each criterion are added up and the following minimum points required for each star rating is assigned. For child care centers, as described in one embodiment of the invention, the required total scores overall rating is as follows:
  8 points minimum for Star 1;
  16 points minimum for Star 2;
  24 points minimum for Star 3; and,
  32 points minimum for Star 4.

For family homes, as described in one embodiment of the invention, the required total scores for the overall rating is as follows:
  10 points minimum for Star 1;
  16 points minimum for Star 2;
  22 points minimum for Star 3; and,
  28 points minimum for Star 4.

It should be recognized that the overall points required can be modified or adjusted to accurately reflect the quality of the program. In addition, if a different basis for scoring is chosen, then the overall rating minimum points will change as well. For example, if a ten-star rating program is chosen, then the overall rating minimum values should be adjusted to reflect the ability to achieve ten stars versus four. The above description is only one method of accomplishing the goal and spirit of the invention.

Figure 2:
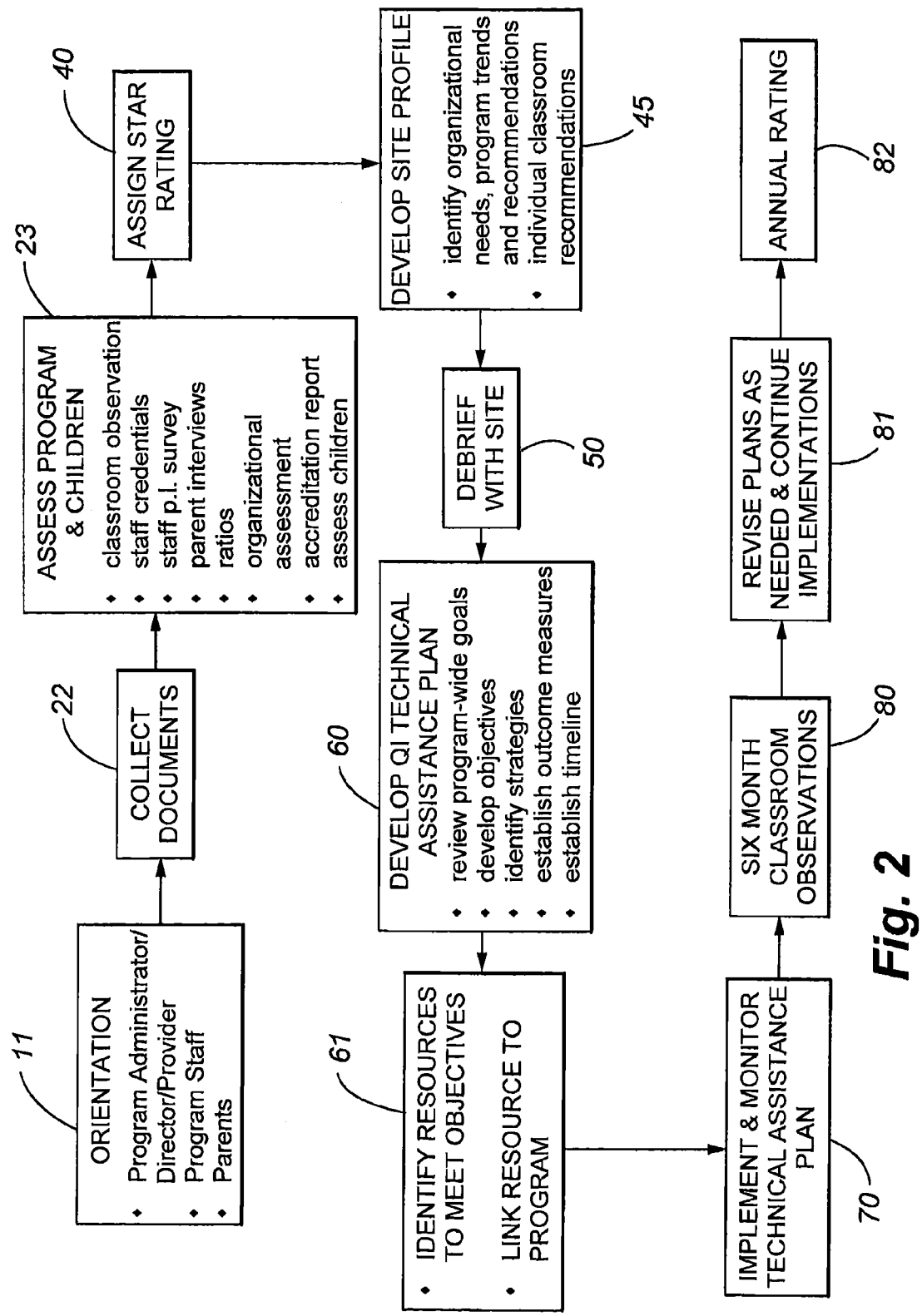
FIG. 2 depicts a flowchart of another embodiment of the method of the invention.

FIG. 2 shows a method of improving an educational program according to the invention. The first step in this embodiment is to evaluate the educational program by assigning an overall rating to the educational program, shown in FIG. 2 by elements 11, 22, 23, and 40. The rating is based on observations of criteria which address the strengths and weaknesses of the educational program. For the purposes of having personnel involved in the educational program understand the process, in one embodiment of the invention, a site profile 45 can be developed. The second step, shown by elements 45, 60, and 61 of FIG. 2, is to identify the weak areas of the educational program and develop an improvement process to address the weak areas. The next step, also subsumed in elements 45, 60, and 61 in FIG. 2, is to identify the strong areas of the educational program and develop a maintenance program to maintain the strength of the educational program. The maintenance programs and the improvement processes are then implemented, shown by element 70. The last step is to reevaluate the educational program, at some later point in time, to determine the extent of improvement and maintenance, shown in FIG. 2 by elements 80, 81 and 82. Element 80 describes a six month reevaluation period. It should be recognized that any period of time can be chosen in which to reevaluate the programs. Element 81 provides the option of revising the programs and processes implemented during the first evaluation of the program in order to provide flexibility to the improvement processes and maintenance programs. Element 82 provides for annual overall rating to be assigned to the educational program. Of course, the overall rating can be assessed on a bi-annual, semesterly, quarterly, or monthly assessment, dependent on the particular needs of the educational program.

Figure 3:
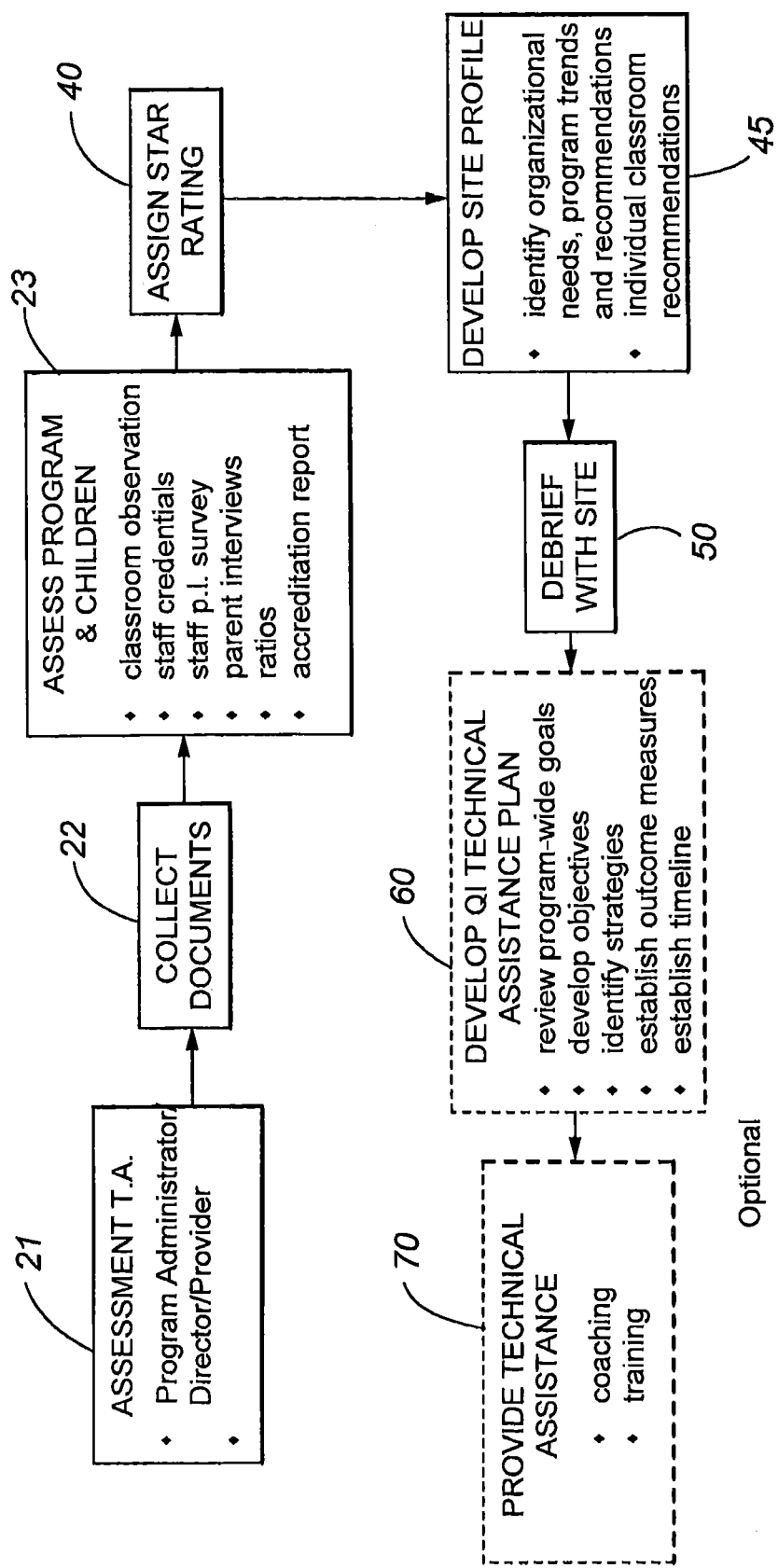
FIG. 3 depicts a flowchart of one embodiment of the method of the invention.

FIG. 3 depicts another embodiment of the invention. In this embodiment, the invention describes a method of evaluating an educational program which, firstly, develops criteria which address the strengths and weaknesses of the educational program (not shown in FIG. 3). The criteria are typically age and grade level specific so as to appropriately evaluate the educational program. The second step is to conduct an assessment of the educational program with the program administrators.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The last step in this embodiment is to debrief the personnel on the overall rating, shown by element 50. As an option in one of the embodiments of the invention, a site profile can be developed. The site profile can provide general guidance to the educational program such as identifying the organization's needs, program trends and providing recommendations regarding the general organization's needs and program trends. The site profile can also be broken into specific classroom recommendations and guidance. FIG. 3 also provides an additional optional step of the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 3, the educational program can be reassessed and reevaluated according to the present invention at some point in the timeline to determine whether the overall star rating improves or changes based on the implementation of the technical assistance plan. A further additional optional step, shown by element 70, is the provision of technical assistance, in the form of coaching and training programs, in implementing the technical assistance plan.

Figure 4:
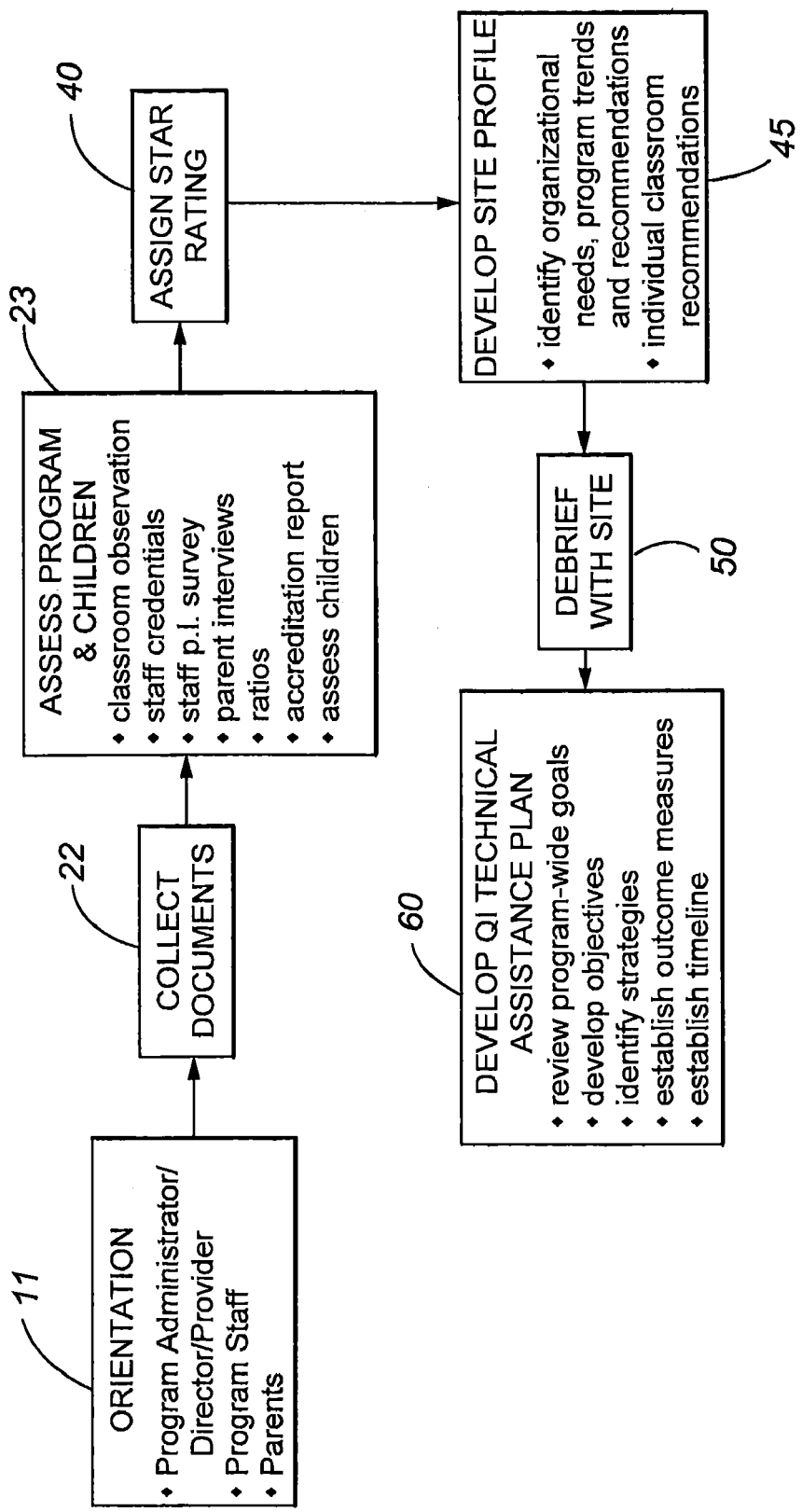
FIG. 4 depicts a flowchart of one embodiment of the method of the invention.

FIG. 4 depicts yet a further embodiment of the present invention. In this embodiment, the invention describes a method of evaluating an educational program which, firstly, develops criteria which addresses the strengths and weaknesses of the educational program (not shown in FIG. 4). The criteria is typically age and grade level specific so as to appropriately evaluate the educational program. The second step is to orient personnel involved with the educational program as to the criteria and goals of the method. These personnel include the administration, the staff, the teachers, the parents, and even the children or students, if appropriate. This orientation can take place through presentations, meetings, and other public forum functions. In one embodiment, the orientation is separated into groups, for example, the orientation of the administrators involved in the program are oriented, the staff is oriented in a separate session and the parents are oriented in yet another session. Of course, the present inventors contemplate conducting the orientation in one group or any number of groupings, depending on the dynamics of the educational program to be oriented. In one embodiment, this orientation step can also include training of site coaches or persons who will be conducting the assessment. It can also include the training of those persons who will be provide the quality improvement coaching and training, following the assessment.

The third step, shown by elements 21, 22, and 23, is to observe the criteria in the educational program. As discussed above, the observation step can include any form of information gathering technique. A numerical value is then assigned to the criteria and an overall rating is assigned based on the numerically valued criteria, shown by element 40. The embodiment depicted in FIG. 4 contemplates that a site profile, shown by element 45, will be developed. The site profile can provide general guidance to the educational program such as identifying the organization's needs, program trends and providing recommendations regarding the general organization's needs and program trends. The site profile can also be broken into specific classroom recommendations and guidance. The next step in this embodiment is to debrief the personnel on the overall rating, shown by element 50. The last step in the embodiment depicted in FIG. 4 contemplates the development of a quality technical assistance plan, shown as element 60, that will review the program-wide goals, develop objectives to be achieved, identify strategies for accomplishing the objectives, establish outcome measures by which the educational program can measure success, and establish a timeline in which the educational program will achieve the objectives. As an additional step, not shown in FIG. 4, the educational program can be reassessed and reevaluated according to the present invention at some point in the timeline to determine whether the overall star rating improves or changes based on the implementation of the technical assistance plan.

The present inventors specifically contemplate the invention utilizing an electronic database having the criteria and/or the various factors that make up the criteria in the database. Then, when one observes the criteria, the observations and numerical values associated with each criteria or factor are placed directly into the database. The database then calculates the numerical values for each of the criteria and the overall rating, based on the programming of the database to do so. The database can be contained in a laptop, such that the unit would not require any other inputs. The database can also be placed on a hand-held computing device such that the inputs will be communicated to a parent computer through a communications link or the database can be web-based and accessible through the Internet.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Nor should any particular series of steps in any method deemed rigid—the present invention comprises the enumerated steps, but not necessarily in any particular order/sequence. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A method of evaluating an educational program for children ages up to 5 years old, comprising the steps of:
   (a) obtaining criteria for evaluating the educational program; and
      wherein said step of evaluating is performed by a computer processor and includes entering data corresponding to the criteria into an electronic database via a communications network and wherein said criteria includes information descriptive of each of at least two of (a1) through (a3) following:
      (a1) an educational program staff to child classroom ratio;
      (a2) educational program staff qualifications including at least one of (a2-1) through (a2-3) following:
         (a2-1) staff educational credentials,
         (a2-2) a duration of paid experience in educating children, and
         (a2-3) college course credits substantially related to child development; and
      (a3) responses by at least a majority of parents having a child in the educational program, wherein for each parent of the majority of parents, at least one of said responses by the parent is indicative of one or more of the following (a3-1) through (a3-3):
         (a3-1) an assessment related to welcoming visits by the parent at substantially all times to the educational program;
         (a3-2) an assessment related to an adequacy of information on the daily activities in the educational program of the parent's child; and
         (a3-3) an assessment related to an adequacy of information from the educational program on at least some of (a3-3-1) through (a3-3-3) following:
            (a3-3-1) learning goals for children in the educational program,
            (a3-3-2) teaching approaches for children in the educational program,
            (a3-3-3) how child behavior is managed in a classroom environment;
   (b) evaluating the educational program for obtaining evaluation data related to the criteria;
   (c) determining from said evaluation data, a plurality of ratings for the criteria, wherein each rating of the plurality of ratings is determined by determining an effectiveness of the educational program according to a different collection of one or more of (c1) through (c22) following:
      (c1) a portion of the evaluation data indicative of a classroom space for one or more children in an age range of up to 5 years old;
      (c2) a portion of the evaluation data indicative of classroom furnishings for one or more children in an age range of up to 5 years old;
      (c3) a portion of the evaluation data indicative of child greeting and departure rituals one or more children in an age range of up to 5 years old;
      (c4) a portion of the evaluation data indicative of a child feeding schedule(s) for one or more children in an age range of up to 5 years old;
      (c5) a portion of the evaluation data indicative of a child feeding procedure(s) for one or more children in an age range of up to 5 years old;
      (c6) a portion of the evaluation data indicative of a child nap or rest schedule(s) for one or more children in an age range of up to 5 years old;
      (c7) a portion of the evaluation data indicative of a child nap or rest procedure(s) for one or more children in an age range of up to 5 years old;
      (c8) a portion of the evaluation data indicative of a child toileting schedule(s) for one or more children in an age range of up to 5 years old;
      (c9) a portion of the evaluation data indicative of a diapering schedule(s) for one or more children in an age range of up to 5 years old;
      (c10) a portion of the evaluation data indicative of a diapering procedure(s) for one or more children in an age range of up to 5 years old;
      (c11) a portion of the evaluation data indicative of a hand washing procedure(s) for one or more children in an age range of up to 5 years old;
      (c12) a portion of the evaluation data indicative of a tooth brushing procedure(s) for one or more children in an age range of up to 5 years old;
      (c13) a portion of the evaluation data indicative of a safety practice(s) for one or more children in an age range of up to 5 years old;
      (c14) a portion of the evaluation data indicative of a quantity of books for one or more children in an age range of up to 5 years old;
      (c15) a portion of the evaluation data indicative of a quantity of pictures for one or more children in an age range of up to 5 years old;
      (c16) a portion of the evaluation data indicative of a use of sequence cards, sorting games, and number games for children in an age range of up to 5 years old;
      (c17) a portion of the evaluation data indicative of physical activities for one or more children in an age range of up to 5 years old; and
      (c18) a portion of the evaluation data indicative of interaction between educational program staff and children in an age range of up to 5 years old;
      (c19) a portion of the evaluation data indicative of an accreditation by one or more accrediting entities operated independently of the educational program;
      (c20) a portion of the evaluation data indicative of an involvement of parents having a child in an age range of up to 5 years old in the educational program;
      (c21) a portion of the evaluation data indicative of educational credentials of staff at the educational program; and
      (c22) a portion of the evaluation data indicative of a ratio of educational program staff to children in the educational program;
   (d) providing said plurality of ratings to a computational device for combining to obtain an overall rating for the educational program, wherein said overall rating designates a quality of childcare for the educational program;
   (e) providing a communications network interface for accessing the overall rating of the educational program via a communications network; and (f) transmitting the overall rating to a user accessing the network interface so that the overall rating can be presented to the user;
(g) identifying the weak areas of the educational program;
(h) developing an improvement process to address the weak areas;
(i) identifying the strong areas of the educational program;
(j) developing a maintenance program to maintain the strength of the educational program;
k) implementing the maintenance programs and the improvement processes;
(l) reevaluating the educational program, at some later point in time, to determine the extent of improvement and maintenance;
(m) revising the program after said step of reevaluating to provide flexibility to the improvement processes and maintenance programs;
(n) providing an annual overall rating to the educational program; and
(o) assessing the overall rating on a bi-annual, semesterly, quarterly, or monthly assessment.

2. The method of evaluating an educational program according to claim 1, wherein the overall rating is a function of one of: a summation of at least some of said plurality of ratings, and a weighted summation of at least some of said plurality of ratings.

3. The method of evaluating an educational program according to claim 1, wherein at least one rating of said plurality of ratings is determined using a plurality of (c1) through (c18), and another rating of said plurality of ratings is determined using at least one of (c19) through (c22).

4. The method of evaluating an educational program according to claim 1, wherein said step of determining includes at least one rating dependent upon an evaluation of an observation of the educational program.

5. The method of evaluating an educational program according to claim 1, wherein the overall rating cannot reach a highest rating unless said evaluation data indicative of an accreditation indicates that the educational program is accredited by one or more predetermined ones of the one or more accrediting entities.

6. The method of evaluating an educational program according to claim 1, wherein said step of obtaining includes electronically storing a representation of the criteria for evaluating each of (a1) through (a3); and
wherein said step of evaluating includes entering data corresponding to the criteria into an electronic database via a communications network.

7. The method of evaluating an educational program according to claim 1, wherein the step (b) of evaluating includes collecting educational program related data from at least some of: classroom observations, interviews with personnel of the educational program, a review of credentials of personnel of the educational program, and interviews with the children and parents patronizing the educational program.

8. The method of evaluating an educational program according to claim 1, wherein at least one rating of the plurality of ratings is determined according to portions of the evaluation data for at least most of (c1) through (c18).

9. The method of evaluating an educational program according to claim 8, wherein and some one of the plurality of ratings is obtained from data related to at least some of (i) through (vi) following:
(i) one or more language activities provided by the educational program,
(ii) one or more reasoning activities provided by the educational program,
(iii) language materials provided by the educational program,
(iv) reasoning materials provided by the educational program,
(v) an adequacy of provisions for a child with disabilities provided by the educational program,
(vi) interaction between the staff and children in the educational program, wherein the interaction includes at least one of: supervision of a child's activities, physical contact between educational staff and children in the educational program, and
(vii) interactions between parents of children in the educational program and the staff of the educational program.

10. The method of claim 1, wherein the communications network includes at least a portion of the Internet.

11. The method of claim 1, wherein said criteria includes information descriptive of each of (a1) through (a3).

12. The method of claim 11, wherein (a2) includes each of (a2-1) through (a2-3).

13. The method of claim 11, wherein (a3) includes each of (a3-1) through (a3-3).

14. The method of claim 13, wherein (a3-3) includes each of (a3-3-1) through (a3-3-3).

15. The method of claim 1, wherein at least one rating of the plurality of ratings is determined using one of (c19) through (c22).

16. The method of claim 1, wherein each of (c19) through (c22) is used in determining a corresponding one of the ratings.

17. A method of evaluating an educational program for children ages up to 5 years old, comprising:
(a) receiving data indicative of a plurality of factors related to an operation of the educational program, wherein the data includes, for each of said factors, corresponding information indicative of one or more of: a classroom environment, an accreditation of the educational program, a parent involvement, staff credentials for staff of the educational program, a curriculum of the educational program, and a staff to child ratio for the educational program;
wherein for at least one of the factors, the corresponding information includes information indicative of parent involvement;
(b) obtaining, using a computer processor, a corresponding rating for each of the factors, wherein the corresponding rating is determined using the corresponding information for the factor;
(c) combining at least two ratings for obtaining a first resulting rating of a plurality of resulting ratings, wherein each of said resulting ratings is dependent on a predetermined collection of one or more of said corresponding ratings for said factors; and,
(d) determining an overall rating for the educational program based on the resulting ratings, wherein said overall rating is determined by an electronic computational device combining at least the first resulting rating and a second of said resulting ratings; and
(e) transmitting, via a communications network interface, the overall rating to a user accessing the network interface so that the overall rating can be presented to the user;
wherein receiving the information indicative of the parent involvement includes a substep of evaluating information indicative of at least most of (1) through (14) following:

(1) educational program documents providing written information on the educational program's philosophy, policies or procedures;
(2) educational program documents providing orientation to the educational program for both parent and child prior to or immediately following enrollment;
(3) whether no more than 50% of the parents report not timely receiving notification of a change in educational program policies;
(4) whether greater than 50% of the parents report that the educational program welcomes visits by the parents at all times;
(5) whether greater than 50% of the parents report at least adequate information from the educational program on their child's physical and emotional well-being;
(6) whether greater than 50% of the parents report at least adequate response by the educational program to parent suggestions;
(7) whether greater than 50% of the parents report at least adequate information from the educational program on their child's daily activities;
(8) whether greater than 50% of the parents report being at least partially comfortable asking educational program staff for information on child development or parenting techniques;
(9) educational program documents related to planned parent conferences to at least annually discuss a child's progress or plans to meet learning goals;
(10) whether greater than 50% of the parents report receiving at least adequate information from the educational program on learning goals for children and teaching approaches;
(11) whether a majority of the parents who have offered ideas or suggestions to the educational program report that the ideas or suggestions are implemented;
(12) whether greater than 50% of the parents report receiving at least adequate information from the educational program about community services;
(13) whether educational program documents regularly include an evaluation of the educational program by parents having a child in the educational program; and,
(14) whether educational program staff and the parents report planned activities for parent involvement in the educational program;
(f) identifying the weak areas of the educational program;
(g) developing an improvement process to address the weak areas;
(h) identifying the strong areas of the educational program;
(i) developing a maintenance program to maintain the strength of the educational program;
j) implementing the maintenance programs and the improvement processes;
(k) reevaluating the educational program, at some later point in time, to determine the extent of improvement and maintenance;
(l) revising the program after said step of reevaluation to provide flexibility to the improvement processes and maintenance programs;
(m) providing an annual overall rating to the educational program; and
(n) assessing the overall rating on a bi-annual, semesterly, quarterly, or monthly assessment.

18. The method of evaluating an educational program according to claim 17, wherein the overall rating comprises a ranking having at least four ranks, wherein the ranks are linearly ordered.

19. The method of evaluating an educational program according to claim 17, wherein the receiving step includes collecting documents, observing classroom operations, interviewing staff of the educational program, reviewing credentials of staff of the educational program, and interviewing the parents whose children attend the educational program.

20. The method of evaluating an educational program according to claim 17, wherein said step of receiving includes receiving, for one of the factors, information indicative of the classroom environment, wherein the information indicative of the classroom environment includes information indicative of one or more of: a space for the educational program, furnishings for the educational program, a personal care routine for the educational program, language activities for the educational program, reasoning activities for the educational program, language materials for the educational program, reasoning materials for the educational program, program structure for the educational program, physical activities of the educational program, interaction between staff and children of the educational program, and interaction between parents and staff for the educational program.

21. The method of claim 1, wherein said step g) comprises developing criteria selected from the group consisting of age and grade level.

22. The method of claim 1, further comprising conducting an assessment of the educational program with program administrators.

23. The method of claim 1, further comprising assigning a numerical value to the criteria and an overall rating based on the criteria.

24. The method of claim 1, further comprising debriefing personnel on the overall rating.

25. The method of claim 1, further comprising developing a site profile to provide general guidance to the educational program comprising identifying needs and program trends and providing recommendations regarding the needs, said site profile categorized in terms of a specific classroom recommendation.

26. The method of claim 1, further comprising developing a quality technical assistance plan that reviews program-wide goals, defines objectives to be achieved, identifies strategies for accomplishing the objectives, establishes outcome measures to establish objective criteria to measure success, and establishes a timeline in which the educational program will achieve the objectives.

27. The method of claim 1, further comprising reassessing the educational program at a predetermined point in time to determine whether ratings improve based on the implementing step k.

28. The method of claim 1, further comprising providing technical assistance, in the form of coaching and training programs.

29. The method of claim 1, further comprising developing criteria which addresses the strengths and weaknesses of the educational program.

30. The method of claim 1, further comprising orienting personnel involved with the educational program as to the criteria and goals of the method, said personnel comprising administrators, staff, teachers, parents, and children.

31. The method of claim 30, wherein said orienting is accomplished by the orientation of the administrators involved in the program and wherein the staff is oriented in a separate session from the orientation of administrators and parents.

32. The method of claim 1, further comprising observing the criteria in the educational program by employing an information gathering technique that assigns a numerical value to the criteria.

33. The method of claim 32, further comprising generating an overall rating based on the numerically valued criteria.

34. The method of claim 1, further comprising developing a quality technical assistance plan that reviews the program-wide goals, develops objectives to be achieved, identifies strategies for accomplishing the objectives, establishes outcome measures by which the educational program can measure success, and establishes a timeline in which the educational program will achieve the objectives.

35. The method of claim 1, further comprising reassessing the educational program at a predetermined point in time to determine whether the overall rating improves.

* * * * *